Sept. 8, 1936. A. C. COTY ET AL 2,053,263
PROCESS AND APPARATUS FOR MAKING BAGS
Original Filed Dec. 19, 1931   8 Sheets-Sheet 1
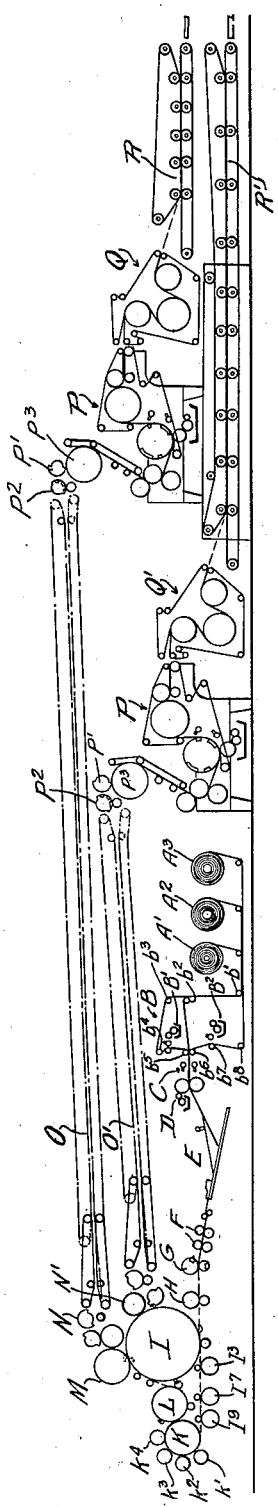
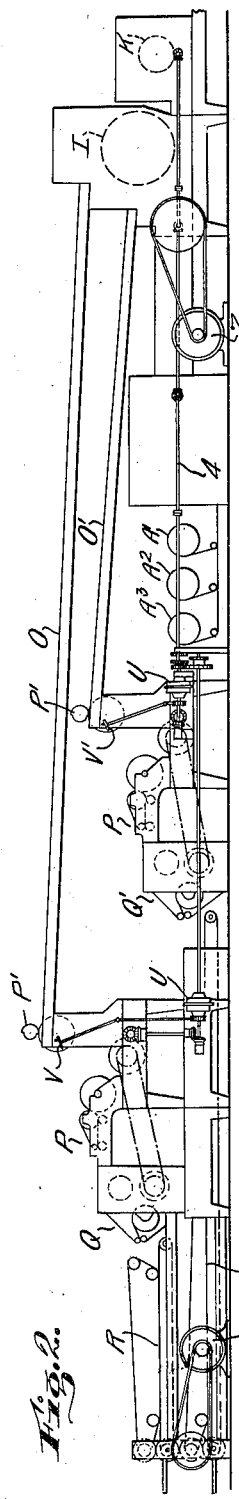
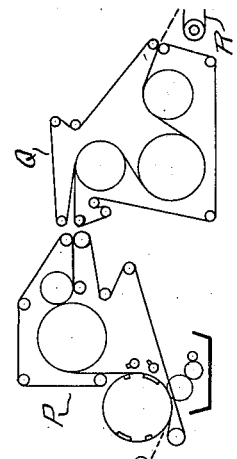
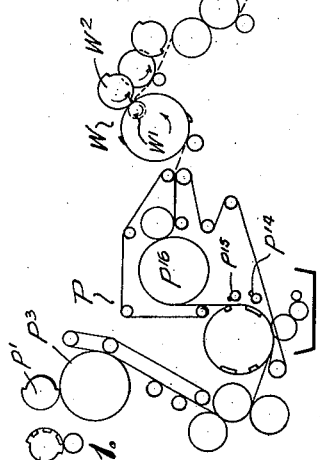
Inventors
Alfred C. Coty and
Thomas Hart Coty
BY Thomas J. Johnstone
ATTORNEY Sept. 8, 1936.   A. C. COTY ET AL   2,053,263
PROCESS AND APPARATUS FOR MAKING BAGS
Original Filed Dec. 19, 1931   8 Sheets-Sheet 2
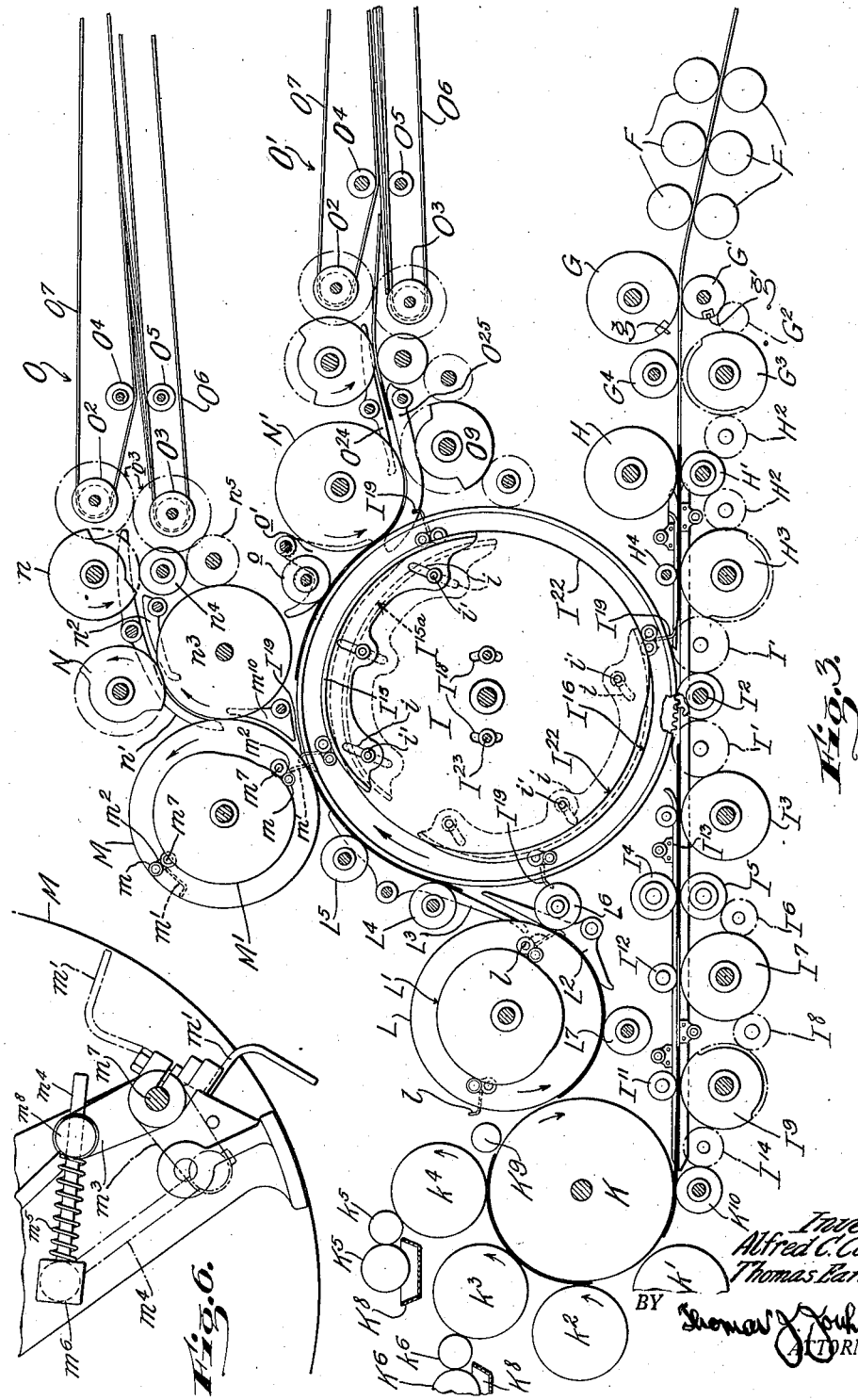

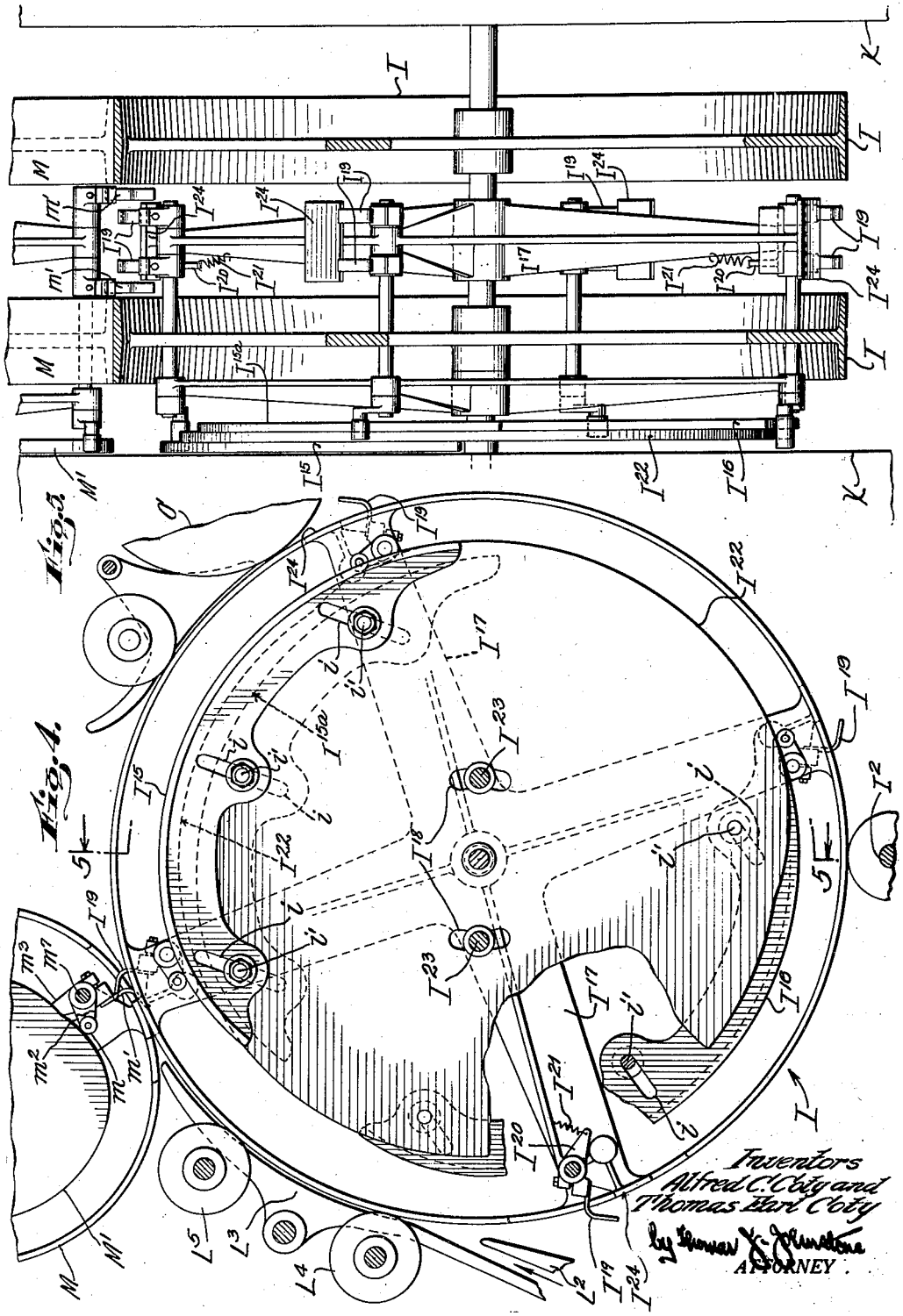

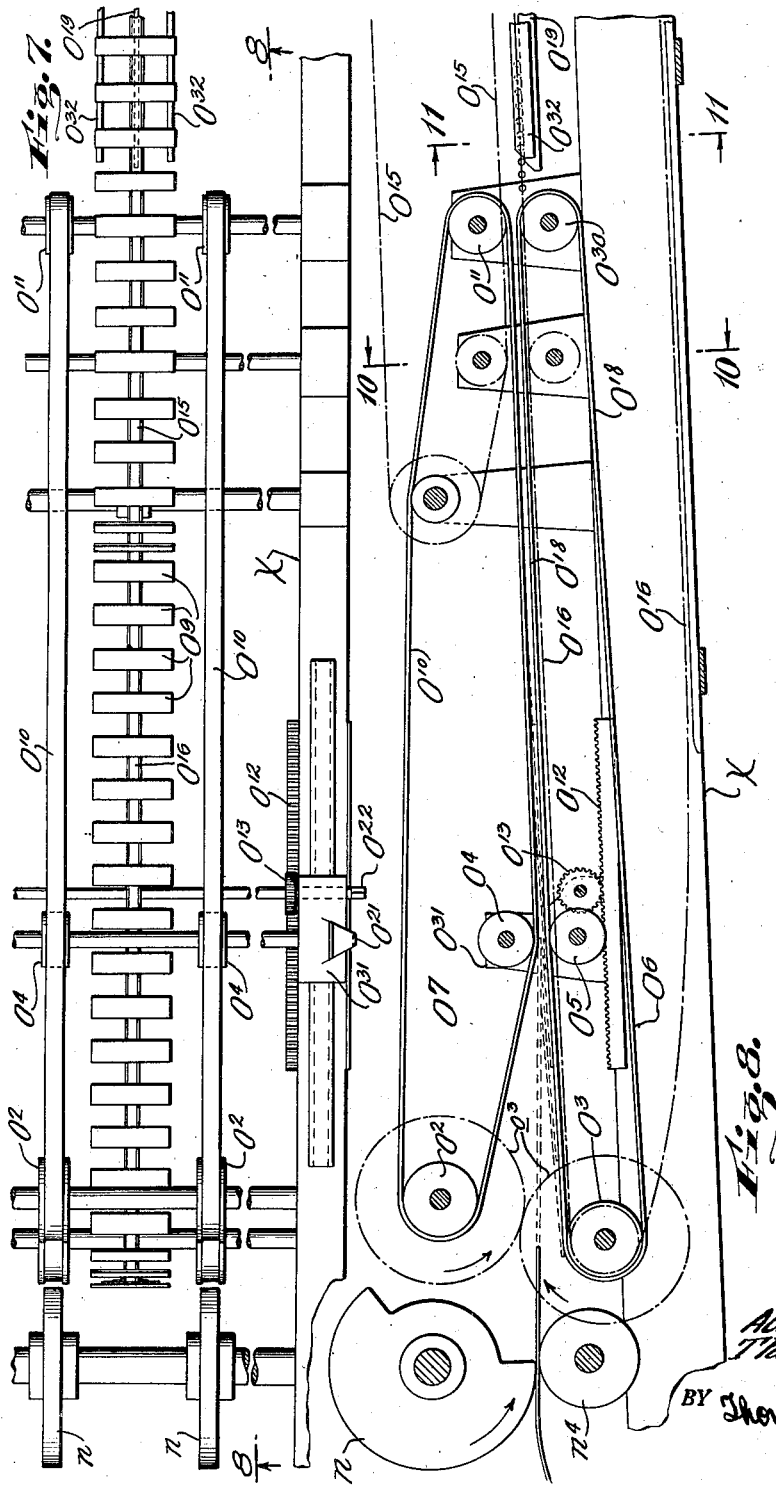

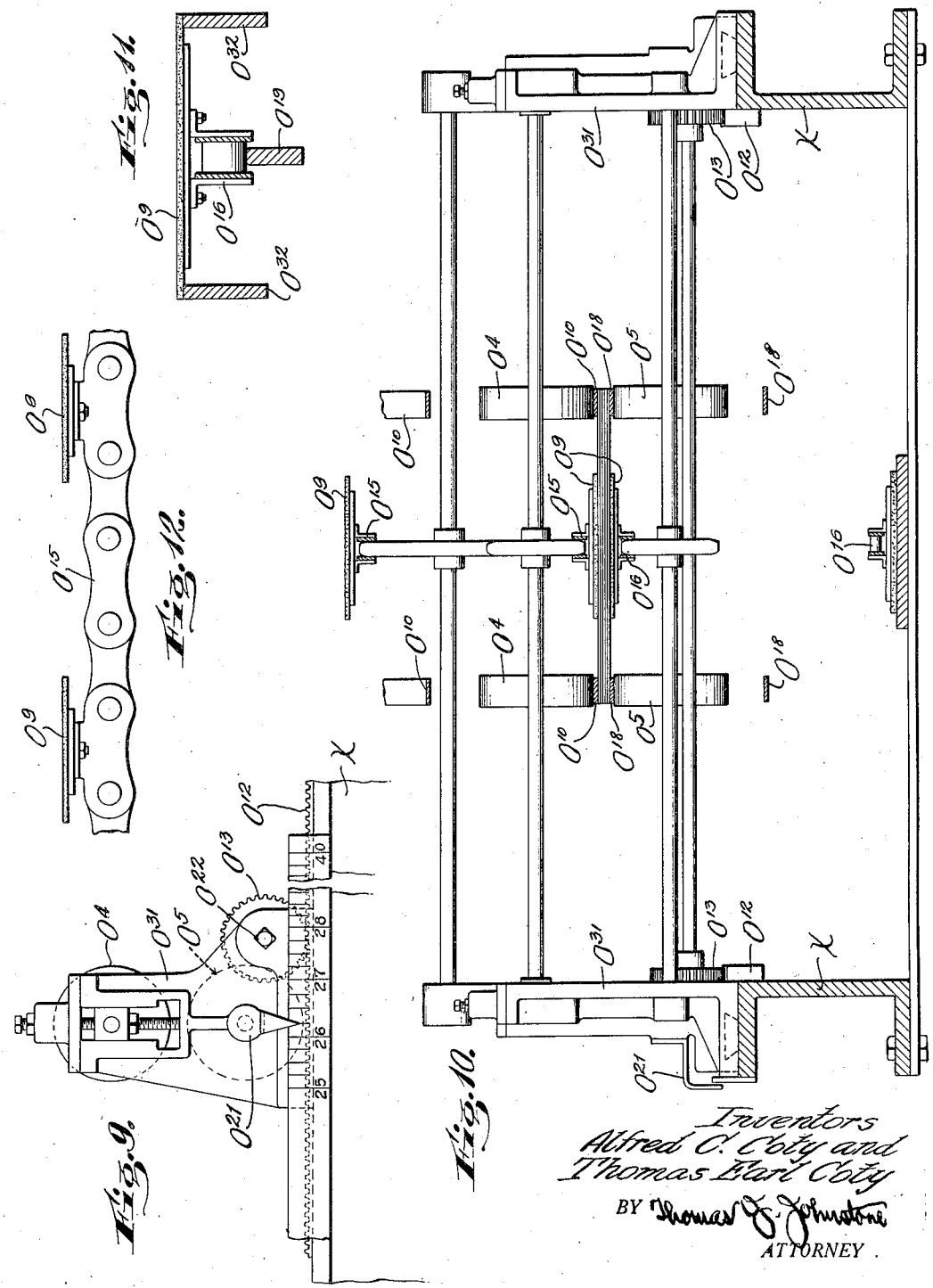

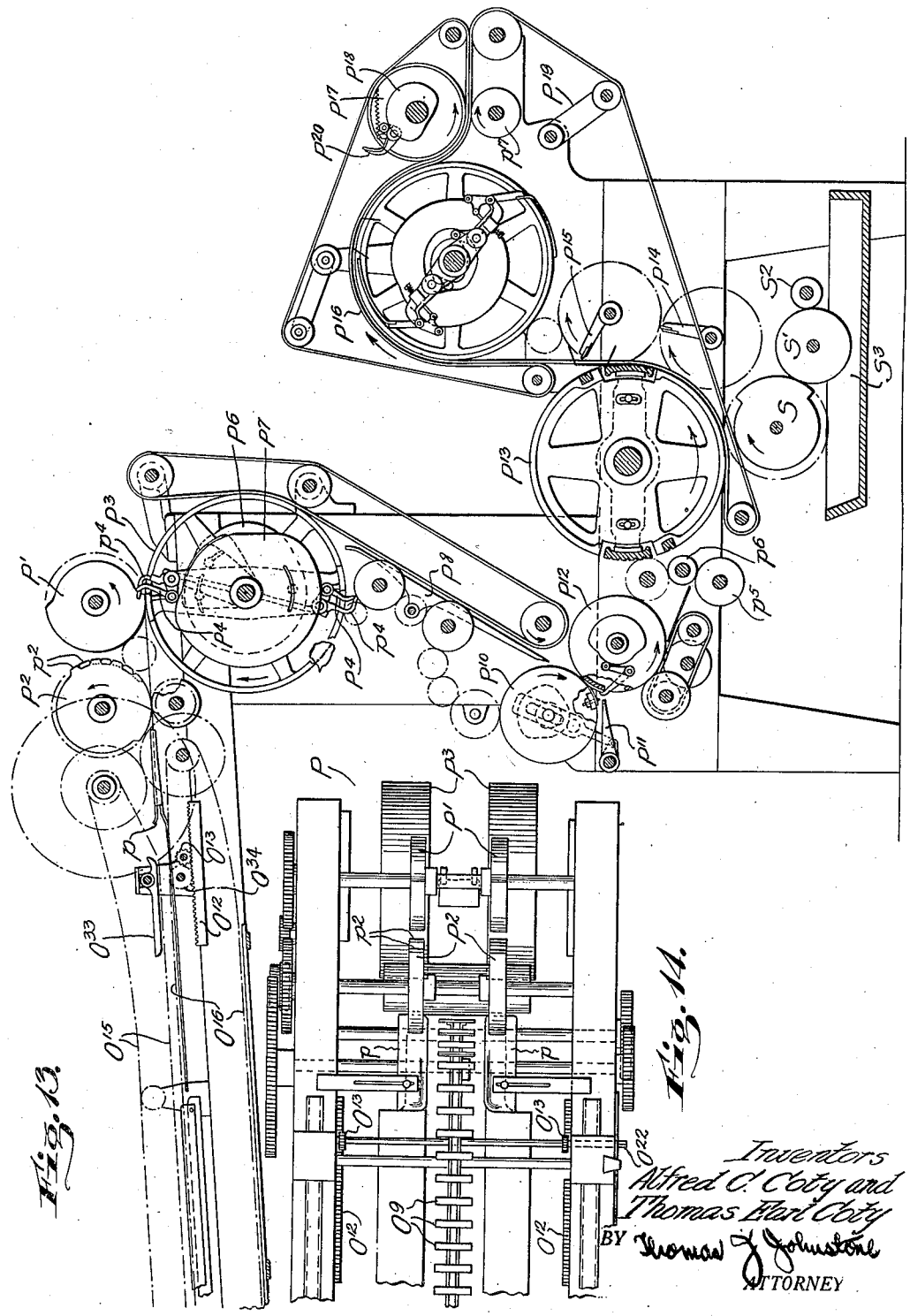

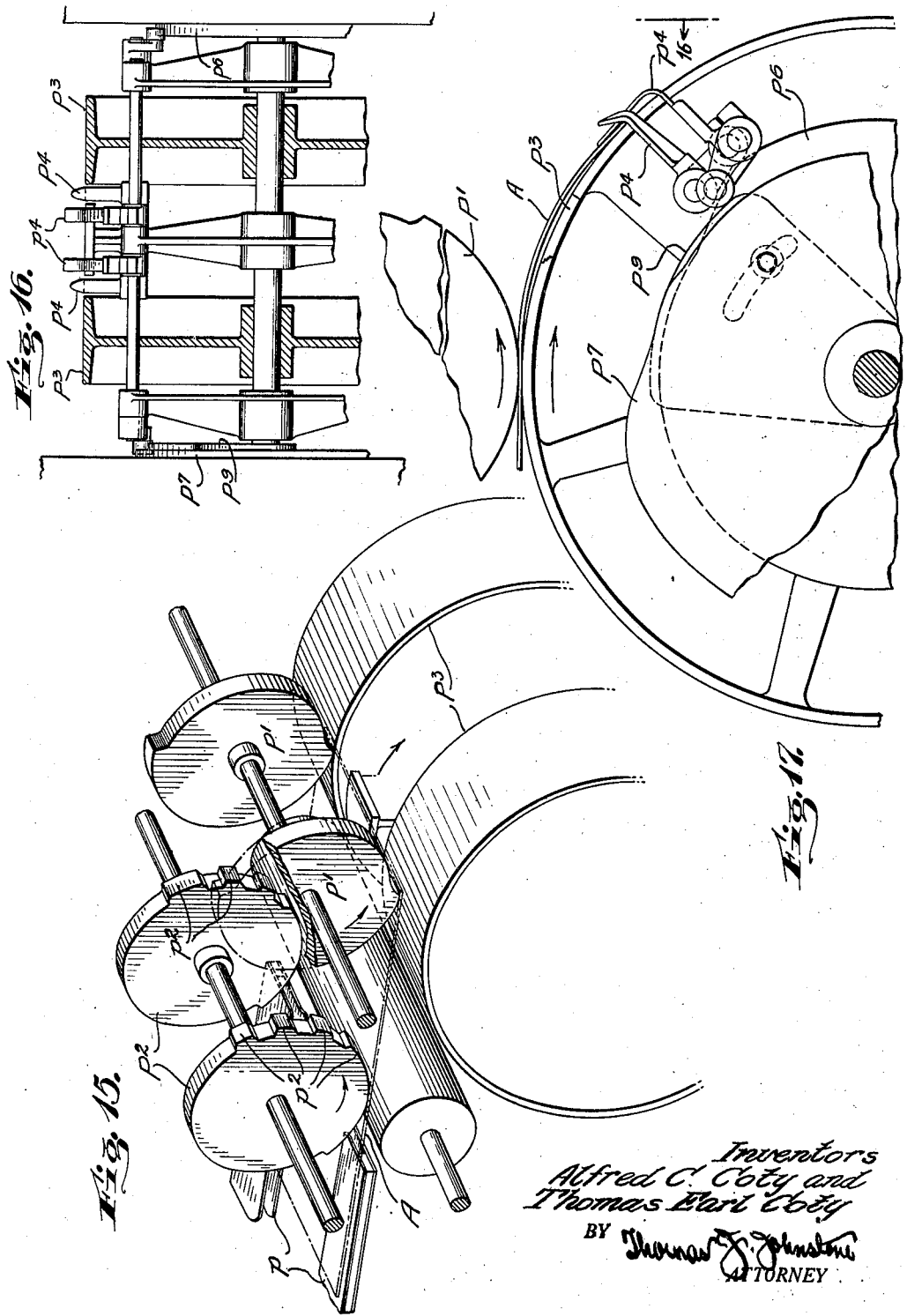

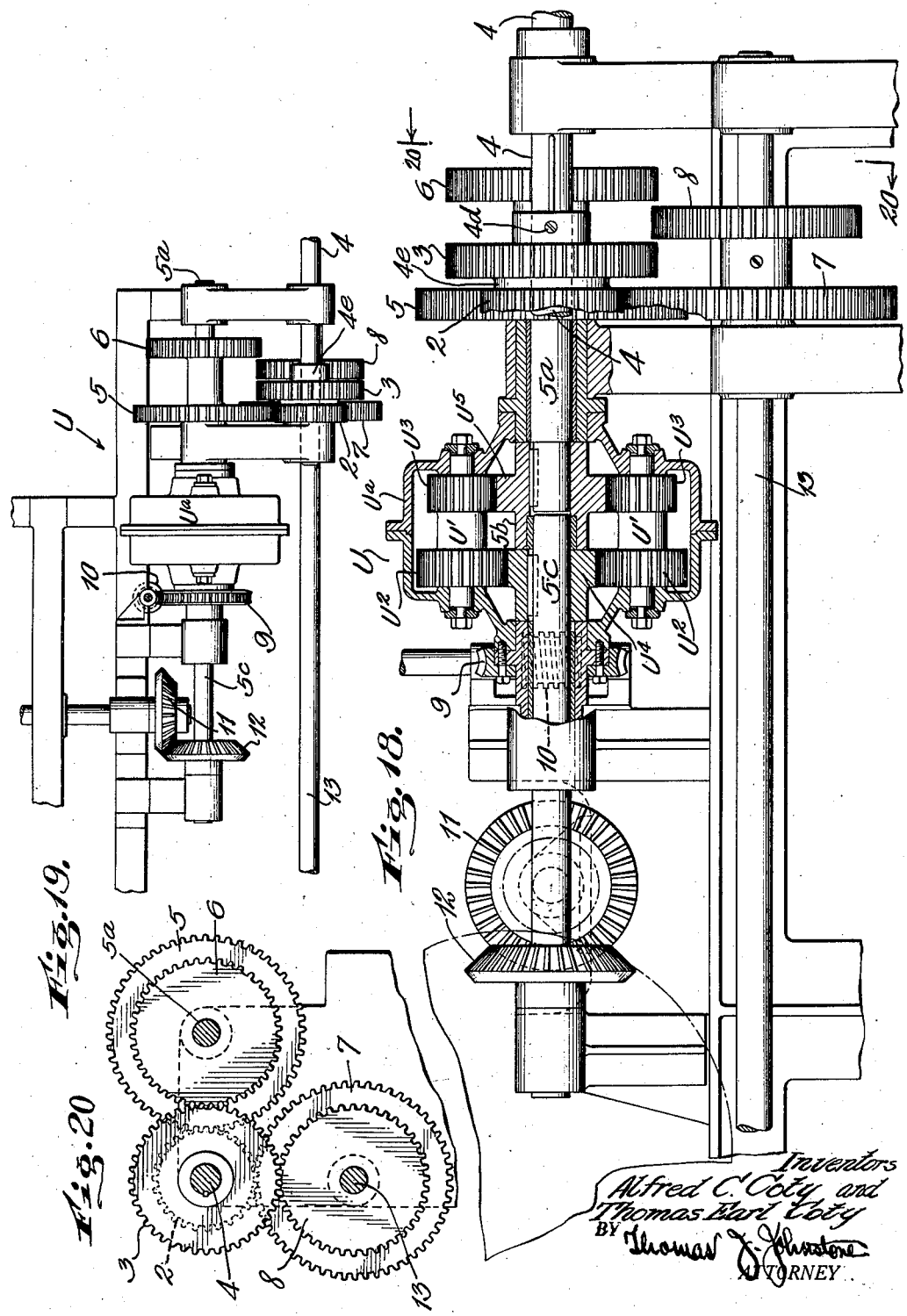

UNITED STATES PATENT OFFICE 2,053,263

PROCESS AND APPARATUS FOR MAKING BAGS

Alfred C. Coty and Thomas Earl Coty, Watertown, N. Y.

Refiled for abandoned application Serial No. 582,164, December 19, 1931. This application October 24, 1935, Serial No. 46,624

22 Claims. (Cl. 93—14)

This application is a refile for abandoned application Serial No. 582,164, filed December 19, 1931.

Our present invention relates to a process for making bags, and apparatus for executing it. In general; the bags are of paper, and it is a characteristic of our invention that their formation is wholly automatic, the continuous web being fed into one end of the apparatus, and the completed bags delivered therefrom. Features of the apparatus may be employed in other relations, and we consider such use to be within the scope of our invention.

In general bags have been made in a series of separate operations, performed on different machines, the completed work of one machine being transferred usually by hand from the exit tables of one piece of apparatus to the entrance of the machine for performing the next step. Thus bags have had the web formed in a tuber, from the tube so formed blanks of the length needed for the particular size of bag being cut off for subsequent operations. Where multiwall bags are made, the web may be formed in the flat, the plies being pasted together, and the web being then run into the tuber. Printing of the necessary advertising may then be effected, usually as the web is run through a press of some form. The web is then cut into "blanks" of suitable size which are fed into "bottomers", which cut, fold and paste the bottoms in various ways. Where the so-called "valve" bag is made, the blank is reversed end for end after the bottom is sealed, and the valve end folded and pasted; one flap being left so that it can be opened for the spout of the filler.

Bags of the cheaper grades and smaller sizes have heretofore been made by printing upon the web and then passing it into a bottomer, wherein the bottom was folded and sealed; but they cannot be used for powdered products because no provision is made for allowing the paste to set, and the bags leak. The printing being done on the web, any change in the size of bag necessitates a change in the size of printing cylinder for each change of bag-length.

The ink used in printing bags in this way may be exceptionally quick-drying, because otherwise it would still be wet when the blank entered the bottomer and the ink would offset on the rolls of the machine and smut the bags. This quick dessication makes the ink "build up" on the typefaces and rollers, resulting in loss of machine-time for cleaning and accumulation of spoil. The objections above noted restrict the use of prior constructions known to us used in cheap bags, while the bags which cater to the higher-priced trade have heretofore compulsorily been made in separate operations.

One of the objects of our present invention is to combine the entire process of bag making by combining all of these separate operations or steps into a single process and to carry out that process in a single unitary apparatus, which takes the web from a roll (or rolls, where a multi-ply bag is to be made) and performs all the operations synchronously upon several bags in process of manufacture and successively upon each bag, each blank being automatically and efficiently transferred from one step and instrumentality of the complete process to the next until the bag emerges completely formed, sealed, and when desired, printed in one or several colors. Each unit embodying our invention thus constitutes what may be called a complete bag factory in a single piece of apparatus.

Another object of the invention is to arrange the various components of the complete apparatus so that they may be conveniently adjusted, usually without stopping, into accurate relation to perform their successive operations in correct timing and registration, saving much machine-time, as well as that of skilled workmen.

Another and important object is so to combine and operate the components of our embodiment that we use for the entire work only the normal operating force of a single machine, instead of the force for each component which is required when they are run separately; and we dispense altogether with the help required for transferring the work from one machine to another, which must then be used.

Another object is to obtain maximum efficiency by running all the component units at the highest speed at which they do their work. To attain this we combine the units capable of relatively high speed with a plurality of units which must be run at a lower speed, and have devised means for feeding the work from the high-speed component to the slower ones in a desired timed relation. Specifically, we combine a tuber, which is a single machine capable of a relatively high operating speed and which is generally run much below capacity (or, if run at full speed the work of which must be stacked and handled twice) with a plurality of bottomers, which are complex and cannot, especially on large bags, be run so fast; and we show herein devices by means of which the output of the tuber is fed alternately to the several bottomers, so that the production of the plant is doubled, without additional operating force and with increased efficiency, since the units work best at their designed speed.

In general, two bottomers exhaust the capacity of a tuber as at present built, but we do not restrict ourselves in that behalf, increased speeds of tubers being quite possible; they have not heretofore been sought, since the tubers were already too fast for the rest of the plant.

Another object of our invention is so to arrange the conveyors which feed the bottomers that the blanks are put under pressure and carried along slowly until the paste in the longitudinal seam, and the inked impressions where the bag is printed, are dried, so that there is no offsetting or cracking in the bottomer. While it is manifest that some sort of conveyor has long been used between the tuber and the bottomer in all automatic machines, our improved conveyor holds the blanks flat and under a slight pressure by employing flights on parallel sprocket-chains, one set for each bottomer, and feeding the blanks thereto in alternation.

Another object of invention is arranging the various units so that the tuber may be run with either one or all of a plurality of bottomers; and special arrangements of gears are shown herein which by a simple shift of a single unit change the ratio of the speed of the tuber to the bottomer from a multiple of the bottomer's speed to an unitary relation.

In the drawings,—

Figure 1 shows in diagrammatic illustration a side elevation of the machine part of our invention.

Figure 2 is a similar side elevation from the opposite side showing the driving means.

Figure 3 is an enlarged detail of the transfer mechanism, the printing mechanism and a selector mechanism, showing a part of the conveyors.

Figures 4 and 5 are similar enlarged details of the transfer cylinder or mechanism shown in Figure 3, Figure 4 being a side elevation and Figure 5 being an end elevation, partly in section on the line 5—5 of Figure 4.

Figure 6 is a detail of the means for throwing the selector fingers out of action when desired.

Figures 7 and 8 are enlarged views, Figure 7 in plan and Figure 8 in side elevation with the shafts in section, of the conveying devices.

Figure 9 is a detail of the tension device for the sprocket chains constituting part of the conveyors.

Figure 10 is an end elevation partly in section of the chain of the conveyors.

Figure 11 is an enlarged detail in section on the line 11—11 of parts shown in Figure 10.

Figure 12 is an enlarged detail in side elevation of a part of the sprocket-chain conveyors.

Figure 13 is a side elevation of the bottomer device, partly diagrammatic, in connection with the conveyor which serves that particular bottomer.

Figure 14 is a plan of the part of the conveyor adjacent to the entrance to the bottomer.

Figure 15 is a perspective sketch of the mechanism for straightening the bag-blanks as they approach the bottomer.

Figure 16 is an end elevation partly in section of the parts shown in Figure 17.

Figure 17 is a side elevation with the shaft in section of the adjusting mechanism which determines the correct position of the bag blank in entering the bottomer, as shown in the center of Figure 14.

Figures 18 and 19 are respectively a side elevation partly in section and a plan of a compensating gearing for determining the relation of the bottomers to the driving power and to one another.

Figure 20 is an end elevation, looking to the left, of the parts shown in Figures 18 and 19.

Figure 21 is a side elevation showing the arrangement for making valve bags.

We will first describe the general arrangement of the apparatus as illustrated in Figures 1 and 2, and later describe more in detail the various parts. In Figures 1 and 2, therefore, we start with the rolls of paper shown at $A^1$, $A^2$, $A^3$ in the middle of Figure 1. Only three rolls are shown here for convenience of illustration, but it is common to employ five, and there may be more, which can be done without substantial change in the apparatus. Our invention is not limited in that respect. These rolls feed paper to the apparatus B, which may be called a "dispenser". It will be seen that passing around the rolls $b^1$ the upper two sheets of the web reach the roll $b^2$, and the middle one then turns to the left; while the upper one passes up to the roll $b^3$ and over $b^4$, and then on the inside of the roll $b^5$, where transverse stripes of paste are applied to its under surface from the paste-pan $B^1$. A similar device $b^2$ is shown in the lower part of this figure for applying these paste-stripes to the upper surface of the lower sheet, which passes around the rolls $b^8$, $b^7$, $b^6$, where it joins the other two sheets and passes out to the thumb-knife illustrated at C, and passes feeding rolls where the longitudinal streak of paste is applied. The arrangement just outlined is more fully described and claimed in our Letters Patent No. 1,816,361, issued July 28th, 1931.

The paper then passes on around the tuber E of well-known construction, to the drawing rolls F and then to the cut-off knife G. The rolls H then feed it to the distribution roll I, presently more fully to be described in connection with Figure 3. Each blank as it is cut passes along to the printer's impression cylinder K, the little cylinders $k$—$k$ carrying the typefaces or other devices for printing upon the blank. These are not shown in the drawings. The blank then passes between the cylinder K and the cylinder L and up to the selector cylinder M. The arrangement is such, as presently to be described, that this cylinder takes the blanks in alternation from the cylinder I and the tapes surrounding it, and then carries one of them up to the snatch-rolls N, which take it up to the conveyor O. The next blank, however, is carried by the cylinder I down to the roll $N^1$, and thence on to the conveyor $O^1$. The two conveyors are alike in all substantial respects and in practice are arranged one above the other, so as to shorten the machine and make it take less floor room; but we are not restricted in that respect.

The conveyor O feeds the "second bottomer" device P, and the conveyor $O^1$ feeds the "first bottomer" $P^1$. These bottomers are constructed substantially in accordance with our Letters Patent No. 1,770,972, issued July 22nd, 1930, and need be only briefly described.

After the bag-bottom is completed it passes into a pressing device Q, and from there to a conveyor R which takes it out to a table from which it is removed by hand or otherwise. The lower bottomer feeds bags to the presser $Q^1$, and then to the conveyor $R^1$. The two are similar in all substantial respects.

Figure 2 shows the same parts in reverse relation. The shaft 4 drives all of the mechanism from the motor Z. A compensating device U is interposed between the shaft and the first bottomer $P^1$ and a similar device U between the shaft and the second bottomer P. Worm gears controlling the action of these compensating devices are turned by the wheels V—$V^1$, for a purpose to be described in connection with Figures 18 to 20. A second motor $Z^1$ is usually employed to drive the exit conveyors R, $R^1$.

It will be seen that the web, after having the three sheets shown pasted together and the longitudinal streak of paste applied to it, is passed around the tuber E, and then is cut off into blanks by means of the cut-off knife G. These blanks are then handled independently, and this greatly facilitates the printing, because it is much easier to make the print register properly where several impressions are to be made than it is to do so when the printing is done on the web before it is severed, any small error there being cumulative.

It is obvious that blanks can be formed as a separate matter by suitable separate machinery and then stored in a magazine and fed to the apparatus here described, if that method of operation is desired. A suitable feeder is shown in our Letters Patent No. 1,668,761, issued May 8, 1928. In general, however, there are advantages to be attained by the use of the complete machine, as already outlined in our statement of invenion.

Turning now to Figure 3, it will be seen that the web, which has already been notched by the thumb-knife, enters on the right between the draw-rolls F, which are more fully illustrated and described in our Patent No. 1,816,361, already referred to. It then passes to the cut-off knife $g$, carried upon the cylinder G, and co-operating with the slot $g^1$ in the cylinder $G^1$. The radius of the cylinler $G^1$ is an aliquot part of that of the cylinder G, so that the angle of entrance and exit between the two may be increased and thus facilitate the action of the cut-off knife, as described in our Letters Patent No. 1,742,174, issued December 31, 1929. The wheel $g^2$ is an "idler", as it is commonly called, insuring the driving of the snatch-roll $G^3$ in the same direction as the roll $G^1$. The machine contains many of these, which it is not necessary to describe minutely. The blank passes between the snatch-roll $G^3$ and the roll $G^4$, there being no draft on the blank during a part of the revolution of these rolls, the snatch-roll $G^3$ having two diameters as illustrated, this being an old and well-known contrivance in paper-bag machines. The blank continues between the rolls H, $H^1$, to another roll $H^3$ having two diameters, and a pressure roller $H^4$ co-operating therewith. The gears $H^2$, $H^2$, are idlers. This brings the blank to the transfer drum I, which is driven from the shaft $I^2$, the gears $I^1$, $I^1$, being also idlers and transmitting motion to the feed roller $I^3$. The blank passes between $I^3$ and the guide $I^{13}$ and is fed by the rollers $I^4$, $I^5$, $I^7$, $I^{12}$. Gears $I^6$, $I^8$, and $I^{14}$ are idlers. It then passes over the roller $I^9$, which co-operates with the roll $I^{11}$, then passing on to the printer's impression cylinder K. Co-operating with the cylinder K are the type-face cylinders $k^1$, $k^2$, $k^3$, $k^4$. Each of these has its own tank of ink, the tanks for two of the rolls being illustrated and marked $K^8$; while the rolls running in the tank are marked respectively $K^5$, $K^6$, and the doctor-rolls are marked $k^5$, $k^6$, these latter rolls of course applying the ink to the type-face, of whatever form may be selected; inks of different colors may be used. Passing from the cylinder K under the cylinder $K^9$, the blank passes between the cylinder L and the roll $L^7$ to the guide $L^2$. The cylinder L is equipped with fingers $l$, which are mounted on bearings carried by the roll L around the stationary cam $L^1$. As will be seen from the drawings the finger $l$ on the upper left of the roll L will reach the point adjacent to the printer's impression cylinder and the roll $K^9$ just as the end of the blank comes along. The finger then engages it (as the cam roller runs then on the low part of the cam $L^1$) and carries it around to the position shown in the drawings, at the bottom of L, and above the roll $L^7$, at which time it is engaged by the roll $L^6$ and carried on to the guides $L^2$, $L^3$, whence it passes between the rolls $L^4$, $L^5$, and the transfer cylinder I.

At this point of its progress the front end of the bag is engaged between the fingers $I^{19}$ and a plate $I^{24}$ carried by the cylinder I. It will be observed that the finger $I^{19}$ illustrated in the southwest quadrant of the cylinder will reach the opening between the two guides $L^2$, $L^3$, just as the end of the bag does so. These fingers $I^{19}$ of which there are four carried by the cylinder around stationary cams $I^{15}$, $I^{15a}$, $I^{16}$, $I^{22}$ (see Figures 4 and 5) engage the bag until it is brought up to the selector M.

The selector M carries two grippers $m^1$ timed by the stationary cam $M^1$, and cam-roller $m$ to release the blanks; the roller $m$ is mounted on arm $m^2$, swinging on rock-shaft $m^7$. An extension $m^3$ forms with rod $m^4$ a toggle, the rod passing through a hole in the stud $m^8$, and turning on bearing $m^6$. A spring $m^5$ maintains the toggle on either side of centre and holds the gripper in operative position or not, as desired. When it is desired to throw the gripper $m^1$ out of action, the operator presses against the end of the bell-crank stud $m^8$, the spring is compressed and the toggle snaps over around the shafts $m^6$, $m^7$, to the dotted line position, which throws the arm $m^1$ within the periphery of the cylinder M; either or both stops $m^1$ of the selector may thus be thrown out of action.

When both grippers act, all of the blanks are passed from the cylinder I direct to the conveyor O. If either gripper is left operative, the other being withdrawn, the blanks are fed alternately to the two conveyors. The bag being released by gripper $M^1$, is then passed up between the roll N having two diameters, and passing between the goides $n^1$, $n^2$, to the roll $n$ and between that roll and $n^4$, and then passes on to the belt $O^7$, passing around the drum $O^2$ and under the roll $O^4$. The blank then passes on between the belt $O^7$ and a similar belt $O^6$ below it, driven from the bottomer end of the machines by the pulley $O^3$, turned by the lower conveyor chain; and the roll $O^5$ carries this belt $O^6$ so that $O^6$ and $O^7$ co-operate, as presently to be more fully described. When, however, one blank has taken the course just noted, the next blank is carried by the fingers $I^{19}$ around the periphery of the transfer roll I between the guide $o^1$ and the roller $o$ and the surface of the cylinder I. It then runs between the cylinder $N^1$ and the snatch-roll $O^9$ and the two guides $O^{24}$, $O^{25}$, upon the second conveyor, which is in all respects similar to the conveyor in the upper part of the figure, and does not require additional description.

The construction and operation of the cams $I^{15}$, $I^{15a}$, $I^{16}$, $I^{22}$, which latter cam is centered upon the shaft of the cylinder I, will be best understood from Figures 4 and 5. The cam $I^{22}$ is a plate and bears the upper cams $I^{15}$, $I^{15a}$, and the lower cam $I^{16}$. Means for adjusting the position of the plate cam $I^{22}$ is shown in the slots and bolts $I^{18}$, $I^{23}$, and means for adjusting the other cams is shown in the similar mechanism at $i$, $i^1$. The dotted lines following the cam outline in the upper part of Figure 4 are not an adjusted position of the cam $I^{15}$, but represent the cam $I^{15a}$, shown in dotted lines because it is located on the other face of the cam-plate $I^{22}$. See Figure 5.

Referring now to Figure 5 it will be noted that two of the arms $I^{19}$ have their cam rollers long enough to run upon the periphery of the cam $I^{22}$ and also upon cam $I^{15}$ when they run at the top of the cylinder I, but two others of these arms carry cam-rollers which only reach to the central or main cam $I^{22}$, running upon its periphery and being also acted upon by the cam surfaces $I^{15a}$, and $I^{16}$.

Referring now to Figure 3 in conjunction with Figure 4 the finger $I^{19}$ at the bottom of cylinder I is just about to engage with the bag blank coming from the rolls $H^3$, $H^4$. If the cam $I^{16}$ is withdrawn at this time, the finger will continue to engage with the blank, and will carry it around until it engages with the finger $m^1$ upon the selector M, after which it will proceed either to the conveyor O or to the conveyor $O^1$, according to the way in which the fingers $m^1$ are operated. Under this condition the blanks do not pass through the printing mechanism at all, but are carried up on rolls to be distributed to the conveyors. When, however, the cam $I^{16}$ is brought down to a position in which the cam rollers of $I^{19}$ travel upon it, these fingers are released by the action of the cam, and the two blanks then pass on as shown between the rollers $I^4$, $I^5$, and so on to the printing mechanism, passing on around that mechanism and the roll L, being engaged by the finger $l$ and carried up to the selector for distribution.

When the finger $I^{19}$ shown in the southwest quadrant of I and also in Figure 4, engages the blank as it comes from the guides $L^2$, $L^3$, the blank is carried up to the selector; and if the cam $I^{15}$ is advanced the roller (see particularly Figure 5 at the top) will open the finger $I^{19}$, and allow the finger $m^1$ on the selector to engage the blank, and carry it to the conveyor O, this being one of the cam-rollers which extends over both of the cams $I^{22}$ and $I^{15}$. When the next blank comes along, however, and is engaged by a corresponding finger $I^{19}$ this finger is operated by the shorter one of the rollers shown in the middle of Figure 5, and the bag will not be released, the adjustment of the fingers $m^1$ with reference to this cam being such that at this time the finger $m^1$ is moved out of the way so that finger $I^{19}$ continues to engage the blank and it is carried on as shown in the northeast quadrant of the cylinder I until it engages with the feed-rolls of the conveyor $O^1$, at which time the roller shown in Figure 5 is operated by the cam $I^{22}$ to release the grip between the finger $I^{19}$ and the plate $I^{24}$, shown near the middle of Figure 5. It will be seen that by this arrangement the bag blanks are carried in alternation to the conveyors.

On account of the limitation upon the speed commercially desirable in the bottomer, when only one of these is running and the entire output of the tuber is to be fed to it the speed of the tuber is cut down to the maximum speed at which the bottomer runs properly. The fingers $I^{19}$, being timed to the cut-off, operate at all times; if only one bottomer is used, the cams are set to release the blanks at the selector M; cams $I^{15}$ and $I^{15a}$ being adjusted outward; and when these cams are withdrawn, all blanks are delivered to roll N.

It will be also understood in all these cases that the word "cylinder" as used here is merely a convenient single term to indicate pairs of disks or spiders placed side by side upon shafts, at the proper distance apart. The arms of the spiders shown in Figures 4 and 5 are lettered $I^{17}$; tension springs $I^{21}$ tend to press the fingers $I^{19}$ toward the plates $I^{24}$ (with which they engage to hold the blank) by means of the bell-crank arm $I^{20}$.

By examining Figure 3 particularly it will be observed that when the cam $I^{16}$ is advanced to the proper position, the fingers $I^{19}$ (see particularly the one in the lower part of the cylinder I) will intercept the bag blanks as they come from the rolls $H^3$, $H^4$, and will then carry them around and away from the printing mechanism. This is preferred when no printing is to be done upon the bag, and the apparatus may then be operated with either one or two bottomers without any printing. Very great flexibility in the operation is obtained, because the bag blanks may be conveyed around the transfer cylinder I without printing; they may be passed around the printing cylinder K and printed in one or a number of colors; they may then be returned to the transfer cylinder L and sent to either one of the conveyors as may be desired, or in alternation to both of them.

In Figures 7 and 8, $O^{10}$, $O^{10}$, are belts of the upper conveyor running on the pulleys $O^2$ and $O^{11}$; similar belts $O^{18}$ for the lower conveyor run on pulleys $O^3$, $O^{30}$. Rolls $O^4$, $O^5$ (see also Figure 9) are carried by a bracket $O^{31}$, by rotating which by means of a tool on square shaft $O^{22}$ the bracket is moved along the rack $O^{12}$, the pointer $O^{21}$ indicating its position on the scale shown. The length of the V-shaped opening between the upper and lower belts of the conveyors into which the snatch-roll $n$ shoots the blanks is thus adjusted to the length of blank being handled, and the amount of overlap desired, the conveyors usually running slower than the rest of the apparatus.

Upper and lower sprocket chains (see also Figures 10 to 12) $O^{15}$ $O^{16}$ carry flights $O^9$ which engage the blanks between them after leaving the belts $O^6$, $O^7$, the upper part of the chain $O^{16}$ running on a way $O^{19}$, the outer ends of the flights $O^{16}$ running on supports $O^{32}$ to keep the blanks in a plane.

Cylindrical devices have been proposed for pressing the paste seams while the paste is drying. As shown herein, we employ such devices, which are old and well known in this relation, for pressing the seams in the bag-bottom after that is formed. They work well there, because the bottom folds are narrow (even in a large multi-ply bag they are only about three inches wide) and lie practically flat on the periphery of a reasonably large cylinder. These devices do not work so well with the longitudinal seam, however, as bending the web first in one direction around a cylinder and then reversing the bend may crack the seam and make the bag leak. This difficulty is wholly avoided in the conveyors disclosed in this case.

In practice, the length of these sprocket-chain conveyors is so selected as to give the paste and/or the ink time to dry before the bottom of the bag is to be folded, and for this purpose the sprocket chains run at a lower speed than the motion of the bags during the other parts of the operation. As a consequence, as will be seen in Figures 3, 8, and 10, the bags overlap each other between the flights of the sprocket chains, and also inasmuch as the bags get out of line and yet are still carried on by the conveyor without difficulty, it is desirable to make sure that they are straightened out so as to approach the first cylinder of the bottoming machine with the bag presented in its correct position, which is with the forward edge of the blank normal to the line of travel. The means for accomplishing these effects is shown in Figures 13 to 17. We describe Figure 13 first because it is unnecessary to give a very detailed description of it. Omitting for the present the devices in the upper part of the figure, we sketch only the general features of the bottomer where shown because that is shown in detail in our Letters Patent No. 1,770,972, issued July 22, 1930. For the purpose of this case, therefore, we can say that after leaving cylinder $P^3$, presently to be more fully described, the bag-blank passes down between the belts or tapes shown and the guide $P^8$ to the rolls $P^{10}$, $P^{12}$, which open the mouth of the bag, and by means of the finger $P^{11}$, hold it open until it is engaged by the belts or tapes at the lower part of the figure and is carried between the rolls $p^5$ on the power-shaft and $p^6$ to the tapes in the lower part of the figure. At this time the paste is applied to the bottom by means of the impression-pad on the rolls, which is fed with paste from the roll $S^1$, rotating in the pan $S^3$ and dressed by the doctor $S^2$. The blank then proceeds between the cylinder $P^{13}$ and the creaser blades $P^{14}$, $P^{15}$, to cylinder $P^{16}$ in the upper part of the figure; while the bottom is formed by folding over the rear flap by one of the arms shown (substantially like those shown in our Patent 1,770,972, already referred to) on the cylinder $P^{16}$, after which it passes to the rolls $P^{17}$ and $p^{17}$, where the advance flap is folded over and pressed flat by the blade $P^{20}$ carried by roll $P^{17}$ and operated by the stationary cam $P^{18}$. The bag then leaves the bottomer.

It will be seen that the blank is engaged by the conveyors until its front end enters the guide $p$, passing below the guide $O^{33}$, which may be moved by rack and pinion $O^{12}$, $O^{13}$, as already described in connection with Figure 9, to determine the exact time when the rear end of the blank is released by the conveyors as the front end enters the guides $p$. No further description seems necessary.

Returning now to the upper part of Figure 13 and to Figures 14 to 17, it will be seen (particularly Figure 15) that the bags are brought by the conveyor $p^3$ and in order to present them at the proper angle to the snatch-roll $P^1$, they are passed under interrupted rolls $P^2$, having projections $p^2$ upon their faces. These projections are staggered with relation to one another upon the peripheries of the two rolls, so that the bag which is passing through the guides $p$, $p$ will be brought into alinement therewith, and as shown in dotted lines on Figure 15, will be presented to the snatch-rolls $P^1$, with its front edge normal to the line of travel. At this time (see Figures 13 and 17) the bag is brought into registry with the stop fingers $P^4$, which determine its exact position with reference to the entry into the bottoming machine. It is never out of mechanical engagement with the apparatus so that it is preserved in exactly the same relation all the way through from this point on the cylinder $P^3$ until it reaches the exit of the bottoming machine. When the bag, therefore, is brought into contact with the fingers $P^4$, the grippers $p^4$ engage with it and carry it in the path of the periphery of the cylinder. The fingers $P^4$ and $p^4$ are operated by cam rollers running respectively upon the stationary cams $P^6$, $P^7$, so that they engage the bags at the correct times.

The method of operation of the fingers $P^4$, $p^4$, is as follows. (See particularly Figure 17 in which the action is most clearly illustrated.) When the bag blank is brought in by means of the snatch rolls or disks $P^1$, $P^1$, it is first brought under the gripping portion of the finger $p^4$, and its advance edge brings up against the radial part of that finger. It is then past the proper position of registry, and the fingers $P^4$ are in the rear or on the right of the fingers $p^4$. These fingers form a gauge, or constitute gauge fingers; and the shape of the cam on which the rollers ride is such that after the advance edge of the blank A is brought up by the finger $P^4$, which then engages the top of the bag lightly, the interrupted part of the snatch rollers $P^1$, $P^1$ being then over the bag blank. This action is performed slowly so that the bag acquires no independent momentum and remains in contact with the fingers $P^4$; after which the fingers $p^4$ are pressed down upon it and grip it tightly, carrying it on until it is engaged by the tapes shown on the right in Figure 17, after which it remains in mechanical engagement with the rest of the apparatus until it reaches the bottomer, also shown somewhat conventionally in Figure 13.

We have not thought it necessary to describe at large the pressure devices upon which the bag is pressed to secure the setting of the paste in the bottom and which are indicated at Q—$Q^1$ in Figure 1. The operation appears to us to be sufficiently apparent in these sketches, a bag being passed between the tapes to the first cylinder of the presser, the bottom of the bag being parallel to an element of the periphery, and then around the second cylinder, finally around the third cylinder, and then is carried out by the tapes and dropped upon the conveyor R (or R') which takes it to the delivery tables. These arrangements are old and well-known in the form illustrated. The deleterious effect on the longitudinal seam, referred to above, is no longer present, as that seam has set and dried in the conveyors O, $O^1$.

The bottomer should be connected to the power by devices which permit changes of gearing, since it is sometimes desirable to run a single bottomer in connection with the tuber, as in existing devices. To permit the selection of either one desired we have arranged a system of gearing which is shown in Figures 18, 19, and 20, and in conjunction with this gearing we have arranged devices for changing the angular relation between the shafts of the bottomers and thus also changing the timing of the blanks on entry into the latter. In the figures the general arrangement is marked U. There is a casing $U^a$, which carries sets of gears $U^1$, $U^1$; in the case illustrated, there are two of these so as to balance the thrusts properly, but the number may be varied.

As will be observed from Figure 18 the hubs $U^1$, $U^1$, carry gears of different numbers of teeth, those on the right marked $U^3$, $U^3$, meshing with a gear $U^5$ on a hub $5^b$, which is carried on a reduced portion of the shaft $5^a$. On the other end of the hub are gears $U^2$, $U^2$, meshing with the gears $U^4$, carried upon the shaft $5^c$ in alinement with the shaft $5^a$.

The gears $U^5$ have a greater number of teeth than the gears $U^3$, and the gears $U^2$ have more teeth than the gears $U^4$; but the ratio is such that the shaft $5^c$ rotates at the same speed as shaft $5^a$. On the other end of the shaft $5^c$ is a bevel gear 12 meshing with the bevel gear 11, which drives the first bottomer. Of course a similar arrangement is made on the other shaft driving the second bottomer, as sketched in Figure 2.

It will be seen that the case $U^2$ has attached thereto a worm gear 9, which is rotated by a worm 10 (see Figure 19). The rotation of the case adjusts the relation between the shafts $5^a$, $5^c$, and of course in that way adjusts not only the relation of each of the bottomers to its driving shaft, but since these are geared together it adjusts the relation of the two.

On the right is shown the system of driving gears. The shaft 4 is driven by power (the motor Z, Figure 2) and the gears 2 and 3 are upon a common hub $4^e$, splined upon the shaft 4, the set-screw $4^d$ holding the hub and gears in place. Of course a sliding collar and lever of common form may be employed, if desired, though not illustrated.

In the illustrated position the gear 2 on the shaft 4 meshes with the gear 5 upon the shaft $5^a$ of the first bottomer and also with the gear 7 upon the shaft 13 of the second bottomer. These latter two gears have the same number of teeth and the shafts revolve at the same speed. When the set screw $4^d$ is loosened and the hub is moved to the right, the gear 2 is withdrawn from the gears 5 and 7 and the gear 3 is brought into mesh with either the gear 8 upon the second bottomer shaft, or by carrying it a little further to the right, with the gear 6 on the shaft of the first bottomer. It will be observed that the shift of gearing increases the speed of the bottomer which is brought into mesh with the gear 3; or more accurately, the selected bottomer is thus brought into proper relation with the speed of the tuber. In general the tuber can be operated at higher speed than the bottomer and when the two are run at the same speed, the entire output of the tuber being supplied to a single bottomer, a speed is selected which will enable the bottomer to do its work properly, and the speed of the tuber will be cut down to that adapted to the output of the bottomer. Naturally in a machine of this kind, in which the operation is continuous and the bag web moves along at substantially uniform high speed throughout the entire operation, it is necessary to adjust the relation of the bottomer and tuber so that the blanks enter the bottomer at the appropriate time to engage the various instrumentalities therein.

It is one of the purposes of this arrangement of gearing indicated to adjust the relation of the tuber and the bottomers so that this presentation of the blank to the bottom-forming elements may be correctly timed. It will be observed that this adjustment can be effected while the machine is running, by rotating the handles V—$V^1$ shown in Figure 2, which turn the shaft carrying the worm 10. This is a very great improvement over the ordinary methods of making this adjustment, since in general it has been effected by cut and try, and the machine must be stopped, the change made and then tested; when, if it is not accurately made the first time, the machine must be stopped and started a second time after a second change, and so on; whereas with our arrangement the operator may stand beside the machine and adjuste the entry of the blanks by turning the wheel without leaving his position or stopping the machine, until he has secured the desired relation.

Figure 21 shows in diagrammatic side elevation how we may combine the process already indicated with the method of completing the bag when the valve bag construction is employed, and a suitable combination of machines for carrying out that process. In this figure P corresponds to one of the bottoming machines shown in Figure 1, and somewhat more in detail. It is substantially in conformity with the bottomer shown in our Letters Patent No. 1,770,972, already referred to.

At W is shown the automatically-operating reversing mechanism for the bag which takes it from the bottomer P and by means of the cylinders $W^1$, $W^2$, reverses it end for end while keeping it positively in engagement, so as to present the unfinished end to a second bottomer, also marked P, after which it is carried to the presser Q in the same way as is shown in Figure 1.

We do not consider it necessary to describe and illustrate in detail the reversing mechanism W because it is fully explained and claimed in our Letters Patent No. 1,792,678, issued February 17, 1931.

The process of making bags and the combinations of apparatus for carrying it out as here outlined are rapid, efficient, expeditious and economical. The paper is carried throughout the operation at nearly uniform speed. It is possible, as already outlined, to distribute the product of the tuber (which may be run at full speed) to a sufficient number of bottomers to take care of its maximum output, and by using the reversing mechanism for the valve bag the bags may be made entirely automatically, printed or not as may be desired, and distributed to the various mechanisms free from manual manipulation. The facilities for using a part of the apparatus when it is not necessary to operate at full output are of great advantage and the various adjustments may in general be made accurately without stopping the apparatus.

What is claimed is:

1. The improvement in the art of making valve bags from a web, which consists in forming a tube from a desired number of plies of material; cutting off blanks from the tube; printing the blanks after cutting; folding and pasting one end of the blank to form a bottom for the bag; reversing the position of the blank in the apparatus; and finishing the valve end of the bag, all in a single continuous operation in which the bag-blank is mechanically engaged from the beginning to the end of the operation, as described.

2. In bag-making machinery, a source of supply of blanks; a plurality of bottomers; a selector for distributing the blanks to the bottomers in alternation; and means for throwing the selector out of action at will, so that the blanks are fed to a single bottomer.

3. In the combination described in claim 2, selector mechanism comprising a cylinder; grippers for holding a blank upon the cylinder; and cams for controlling the grippers at appropriate times.

4. In bag-making machinery, a tuber; means for cutting off blanks from the tube formed therein; means for feeding the blanks to printing mechanism; means for imposing desired impressions upon the blanks; transfer mechanism for passing the blanks in succession from the printing mechanism to a plurality of bottomers; and selector means for directing the blanks to the bottomers in a desired manner.

5. In bag-making machinery, a tuber; a knife for cutting off bag-blanks from the tube formed in the tuber; a bottomer; and a transfer mechanism for carrying the blanks to the bottomer; the transfer mechanism comprising two co-operating sprocket chains carrying parallel flights for gripping and pressing the blanks.

6. In bag-making machinery, a tuber; a plurality of bottomers fed in alternation by the tuber, and means for adjusting the initial positions of operating parts of the bottomers relative to one another and to the driving means.

7. A tuber; a pair of bottomers; separate conveyors composed of sprocket chains carrying opposed flights for maintaining pressure upon the blanks carried from the tuber to each bottomer; and a selector feeding the output of the tuber to the conveyors in alternation.

8. In bag-making machinery, means for preparing bag-blanks; a plurality of transfer mechanisms composed of means carrying opposed flights for pressing the blanks from the tuber; a plurality of bottomers fed by the transfer mechanisms; and a selector for passing the bag-blanks to the transfer mechanisms in desired order.

9. In bag-making machinery, a tuber; a knife for cutting off blanks from the tube formed in the tuber; printing mechanism; a bottomer; means for feeding the blanks to the bottomer; and means for passing the blanks consecutively to the printing mechanism and then to the bottomer, or passing them directly to the bottomer, at will.

10. In bag-making machinery, means for assembling a number of plies for forming a web; means for separating the plies; means for applying paste to at least some of the adjacent surfaces of the plies; means for assembling the separated plies into a web; means for forming the web into a tube; means for securing the edges of the tube in place; means for cutting off blanks from the tube; means for printing the blanks; means for forming and sealing the bottoms of the bags; means for reversing the blanks; and means for closing to a desired extent the open end of the bag; the said several means being arranged to act upon a bag-blank while in continuous mechanical engagement therewith, consecutively upon a single blank and simultaneously upon several blanks, as described.

11. In bag-making machinery, a pair of bottomers driven from a single source of power, and means for adjusting the movements of the bottomers in timed relation to one another.

12. In the combination of claim 11, the means described embracing a casing, gears therein, a shaft driven by some of the gears, and means for rotating the casing to change the relation of the driving and driven gears and the relative angular position of the shafts.

13. In bag-making machinery, bottom-forming mechanism, a guide for blanks at the entrance thereof, and means for straightening the blanks so that their front edges are normal to the line of travel as they enter the bottomer.

14. In the combination of claim 13, the means described, comprising interrupted rollers oscillating the blank into alinement, as described.

15. In paper-bag machinery, the means described for adjusting the entering of the bag-blank to the bottomer so that it is correctly timed to engage the blank with the bottoming mechanism, consisting of a finger for stopping the blank, while engaging it lightly, a gage-finger for adjusting the advance edge of the blank to its desired registry position, and means for clamping the blank by the first-named finger when it reaches its correct registry.

16. In the combination of claim 15, operating means for the fingers, consisting of cams and cam-rollers shaped to cause the first-named finger to engage the advance edge of the blank lightly while permitting it to pass beyond its position of registry, the gage-finger then to return the edge to registry, and the first-named finger then to clamp it there, as described.

17. In machinery for forming bags from a web, means for continuously forming a tube from a web composed of a desired number of plies of material; means for cutting off blanks from the tube; means for feeding the blanks as cut to a printing mechanism; means for imposing desired impressions upon the blanks; a plurality of bottomers; means for transferring the blanks as printed to the bottomers in alternation; and means in each bottomer for forming and sealing a closure of the bag; the said several means acting continuously and consecutively upon each blank and simultaneously upon several blanks, as described.

18. In bag-making machinery, a tuber; means for cutting off blanks from the tube formed in the tuber; a bottomer to which the blanks are to be fed in succession; a conveyor carrying the blanks to the bottomer; means in the conveyor for maintaining the blanks under pressure; and means for withdrawing the blanks as they reach the bottomer.

19. In bag-making machinery as described in claim 18, means for driving the conveyor at a speed lower than that of the bottomer; and means at the entrance to the bottomer for accelerating the blank to approximately the speed of the bottomer.

20. In bag-making machinery as described in claim 18, means for feeding the blanks from the tuber to the conveyor in lapped relation, and means for feeding them singly from the conveyor to the bottomer.

21. In bag-making machinery as described in claim 18, means for driving the tuber at a convenient speed; means for driving the conveyor at a speed lower than that of the tuber, whereby the blanks are lapped in the conveyor; and means between the conveyor and the bottomer for accelerating the blanks so that they enter the bottomer at substantially the speed thereof.

22. In bag-making machinery, a tuber; means for cutting off blanks from the tube formed therein; a plurality of bottomers; means for feeding the blanks from the tuber to one or more of the bottomers at will; and means for changing the relative speed of the tuber and bottomer from a speed of tuber which is a multiple of the speed of the bottomer to an unitary relation, as described.

ALFRED C. COTY.
THOMAS EARL COTY.